Feb. 5, 1929.　　　　　　　　　　　　　　　　1,701,296
A. B. CADMAN
STEERING DEVICE
Filed June 14, 1926　　　　2 Sheets-Sheet 1

Inventor:
Addi B. Cadman,
By Chandell Parker Carlson
Attys.

Feb. 5, 1929.
A. B. CADMAN
1,701,296
STEERING DEVICE
Filed June 14, 1926
2 Sheets-Sheet 2
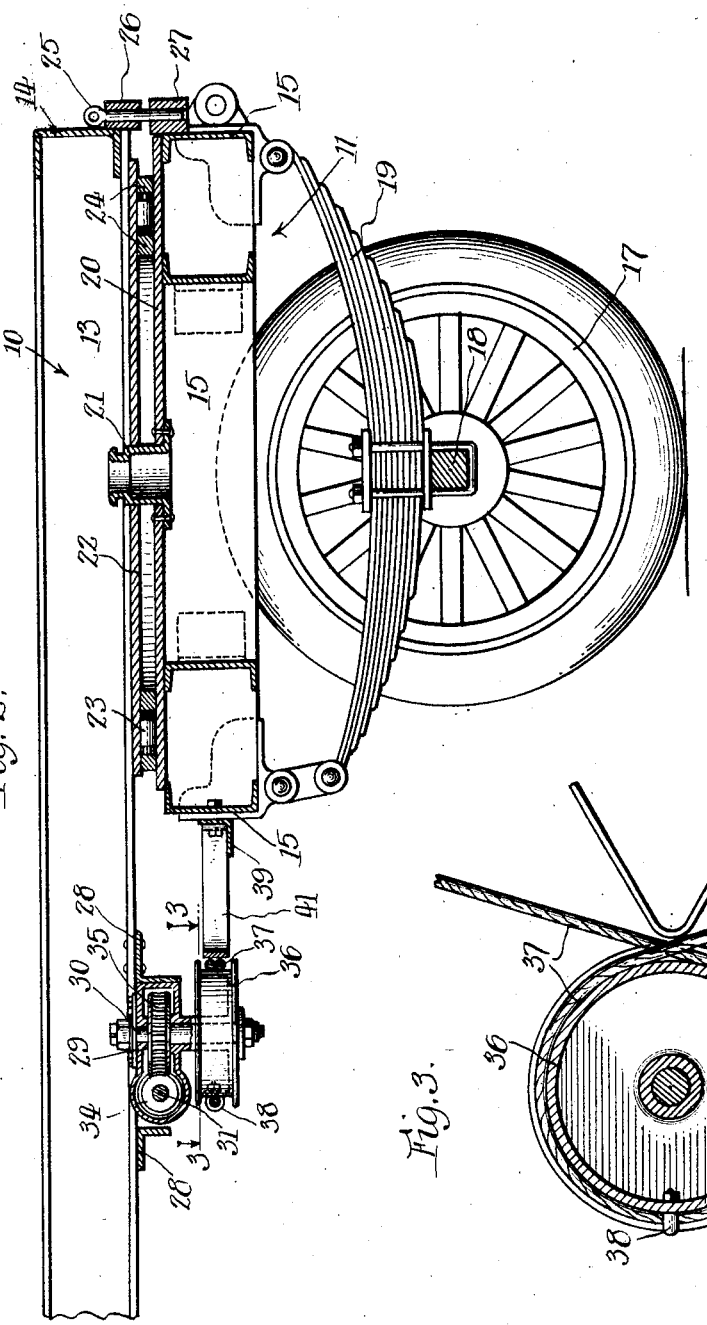
Inventor:
Addi B. Cadman, Patented Feb. 5, 1929.

1,701,296

UNITED STATES PATENT OFFICE.

ADDI BENJAMIN CADMAN, OF BELOIT, WISCONSIN, ASSIGNOR TO WARNER MFG. CO., OF SOUTH BELOIT, ILLINOIS, A CORPORATION OF MICHIGAN.

STEERING DEVICE.

Application filed June 14, 1926. Serial No. 115,768.

My invention relates to vehicles of the four-wheel type, and has particular reference to a steering device for such vehicles.

The primary object of the invention is to provide a steering device of simple and improved construction by means of which a four-wheel vehicle can be moved efficiently into and out of narrow or crooked places.

A more detailed object resides in the provision of a steering device embodying a gear mechanism disposed beneath the frame of the vehicle, and cables connecting the gear mechanism with the supporting turntable of the vehicle, whereby the force exerted to swing the turntable about its axis will be applied with substantially uniform leverage.

Another object is to provide a steering device for trailer vehicles comprising an operating cable, and having a new and improved means for maintaining the cable taut.

Other objects and adantages will become apparent from the following description taken in connection with the accompanying drawings in which, Figure 1 is a fragmentary plan view of a reversible trailer vehicle having a steering device embodying the features of my invention.

Fig. 2 is a sectional view taken along line 2—2 of Fig. 1.

Fig. 3 is a fragmentary sectional view taken along line 3—3 of Fig. 2.

Figure 1:
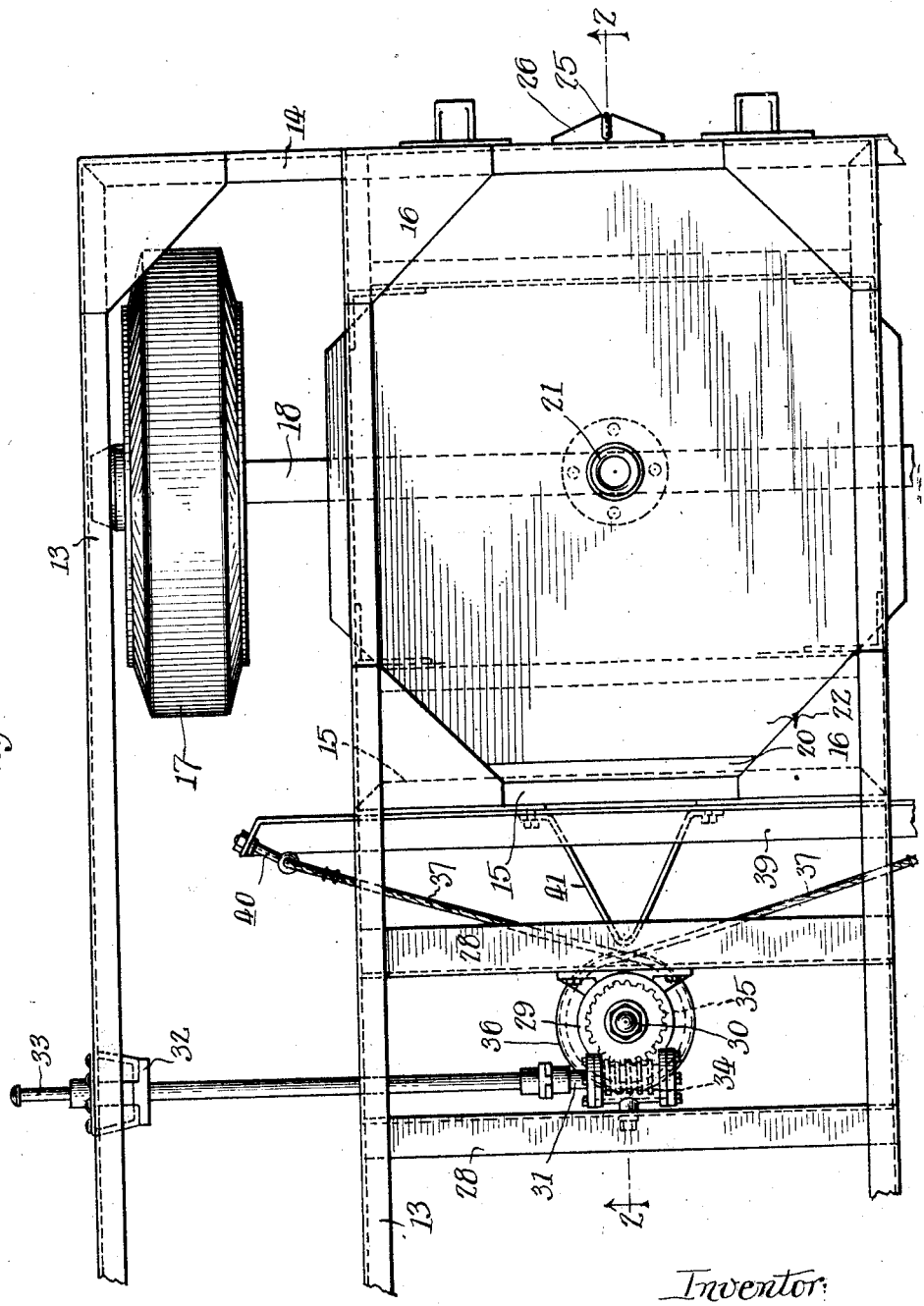

While I have shown in the drawings and will describe in detail the preferred embodiment in my invention, it is to be understood that I do not intend thereby to be limited to the particular form disclosed but aim to cover all modifications and alternative constructions falling within the spirit and scope of the invention as expressed in the appended claims.

The steering device is intended primarily for four-wheeled vehicles, and may be used for steering either the front or rear wheels of such vehicles. In the present instance, the device is mounted on a platform frame 10 of a vehicle and is arronged to swing a turntable 11 supporting the rear end of the frame about a vertical axis. The frame 10 comprises a plurality of longitudinally extending channels 13 rigidly connected by cross bars 14. The turntable consists of four channels 15 reinforced by gusset plates 16 and supported in the usual way by rear wheels 17 through an axle 18 and springs 19. Mounted on the turntable is a flat plate 20 which carries a king pin 21 projecting through a central opening in a plate 22 on the under side of the frame 10 and providing for swiveling between the vehicle frame and the turntable. Rollers 23 mounted between rings 24 provide rolling contact betweeen the plates 20 and 22 in the swinging movements of the turntable. The turntable may be locked to the frame 10 in centered position by a removable bolt 25 extending through holes in lugs 26 and 27 formed respectively on the frame 10 and turntable 11.

Mounted below the center of the frame 10 on cross pieces 28 is a casing 29 in which are journaled a vertical shaft 30 and a horizontal shaft 31, the latter extending transversely of the frame. The outer end of the shaft 31 is journaled in a bearing 32 on the outermost frame bar 13 and carries a hand crank 33 by means of which the shaft 31 may be rotated. Within the casing, the shaft 31 carries a worm gear 34 meshing with a worm wheel 35 fixed to the shaft 30.

Secured to the lower end of the shaft 30 is a flange drum 36 of relatively large diameter to which the medial portion of a flexible cable 37 is securely fastened by an eyebolt 38. The end portions of the cable extend in opposite directions half way around the drum (see Fig. 3) and then cross to the opposite ends of a horizontally disposed angle bar 39 to which the ends of the cable are secured by eyebolts 40. The bar 39 is fastened to and extends along the front cross bar 15 of the turntable, and the ends of the bar 39 are positioned substantially the same distance from the king bolt axis as the shaft 30. It will be observed that when the crank 33 is swung in one direction, a pull will be exerted by the cable on one end of the bar 40 which will swing the turntable about the axis of the king bolt. During the swinging movement of the turntable in either direction, the length of the moment arm of the applied force, which is perpendicular to the cable then under tension, will not be changed materially. Thus a substantially uniform leverage will be maintained as the turntable is moved out of and back into centered position to steer the rear wheels.

To hold the cable taut and to prevent slipping thereof on the drum, a V-shaped bracket 41 is secured to the bar 39 with its closed end normally positioned close to the point where the two portions of the cable cross. When the turntable is swung in one direction, the bracket will be moved into engagement with one end of the cable thereby bending the cable and holding it tightly against the surface of the drum.

The steering mechanism thus provided is simple and inexpensive in construction and reliable and powerful in its operation.

I claim as my invention:

1. A vehicle comprising, in combination, a frame, a turntable supporting one end of said frame, a shaft mounted at the center of said frame, means for rotating said shaft, a bar carried by said turntable and extending transversely of said frame, said shaft and the ends of said bar being substantially equidistant from the axis of said turntable, a member carried by said shaft, and cables connecting said member with the ends of said bar.

2. A vehicle comprising, in combination, a frame, a turntable supporting one end of said frame, a shaft mounted on said frame, a drum carried by said shaft, a cable encircling said drum and having the ends extending in opposite directions, said ends being connected to opposite sides of said turntable, means for rotating said shaft to swing the turntable, and a bracket mounted on said turntable in position to bear against said cable in the swinging movement of said turntable.

3. A vehicle comprising, in combination, a frame, a turntable supporting one end of said frame, a shaft mounted on said frame, a drum carried by said shaft, a cable encircling said drum and having the ends extending in opposite directions, said ends being connected to opposite sides of said turntable, means for rotating said shaft to swing the turntable, and means adapted to bear against the cable during the swinging movement of the turntable whereby to hold said cable taut.

In testimony whereof, I have hereunto affixed my signature.

ADDI BENJAMIN CADMAN.